March 14, 1961

J. CHOMARAT 2,974,903

AIRCRAFT HAVING WINGS PROVIDED WITH
FLAPS AND GAS BLOWING MEANS

Filed June 2, 1958

INVENTOR
Jean Chomarat
BY Bailey, Stephens & Huettig
ATTORNEYS

March 14, 1961
J. CHOMARAT
2,974,903
AIRCRAFT HAVING WINGS PROVIDED WITH
FLAPS AND GAS BLOWING MEANS
Filed June 2, 1958
2 Sheets-Sheet 2
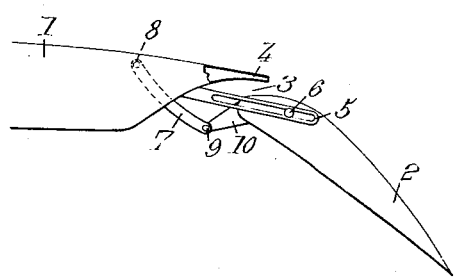
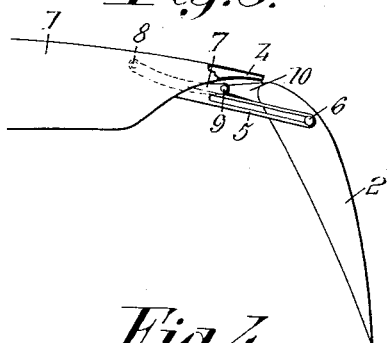
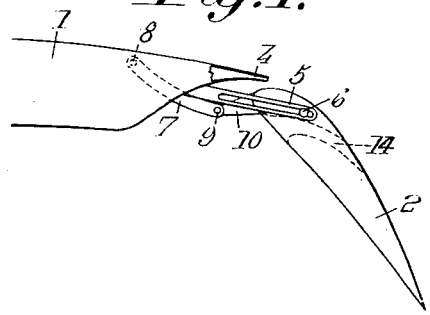
INVENTOR
Jean Chomarat
BY
Bailey, Stephens & Huettig
ATTORNEYS United States Patent Office 2,974,903
Patented Mar. 14, 1961

2,974,903
AIRCRAFT HAVING WINGS PROVIDED WITH FLAPS AND GAS BLOWING MEANS

Jean Chomarat, Paris, France, assignor to Societe de Brevets H.D., Paris, France, a society of France Filed June 2, 1958, Ser. No. 739,136

Claims priority, application France June 4, 1957

4 Claims. (Cl. 244—42)

The present invention relates to aircrafts having wings provided with flaps and it is more particularly but not exclusively concerned with wings provided, on the trailing edges of lift producing surfaces belonging to said wings, with lift increase flaps.

The object of this invention is to improve the efficiency of such structures.

For this purpose, according to the present invention, the means serving to connect the flap to the wing are arranged in such manner that, when said flap is lowered and for a given range of the angles of rotation of said flap, a slot is opened between said wing and said flap, whereas, for another range of said angles, including the maximum one, said slot is closed, the slot effect being replaced, when said flap is lowered to the maximum angle, by the blowing of gas along the upper face of said flap.

Advantageously, means are provided to stop or to reduce this blowing during the landing run of the aircraft.

Preferred embodiments of the present invention will be hereinafter described with reference to the accompanying drawings, given merely by way of example and in which:

Fig. 1 diagrammatically shows an aircraft wing made according to the present invention, the flap being in its upper position.

Figs. 2 and 3 show the rear portion of the same wing with the flap lowered in two different positions, Fig. 3 showing the maximum angle of rotation of the flap with respect to the wing.

Fig. 4 is a view similar to Fig. 2 but relating to a modification.

Figure 1:
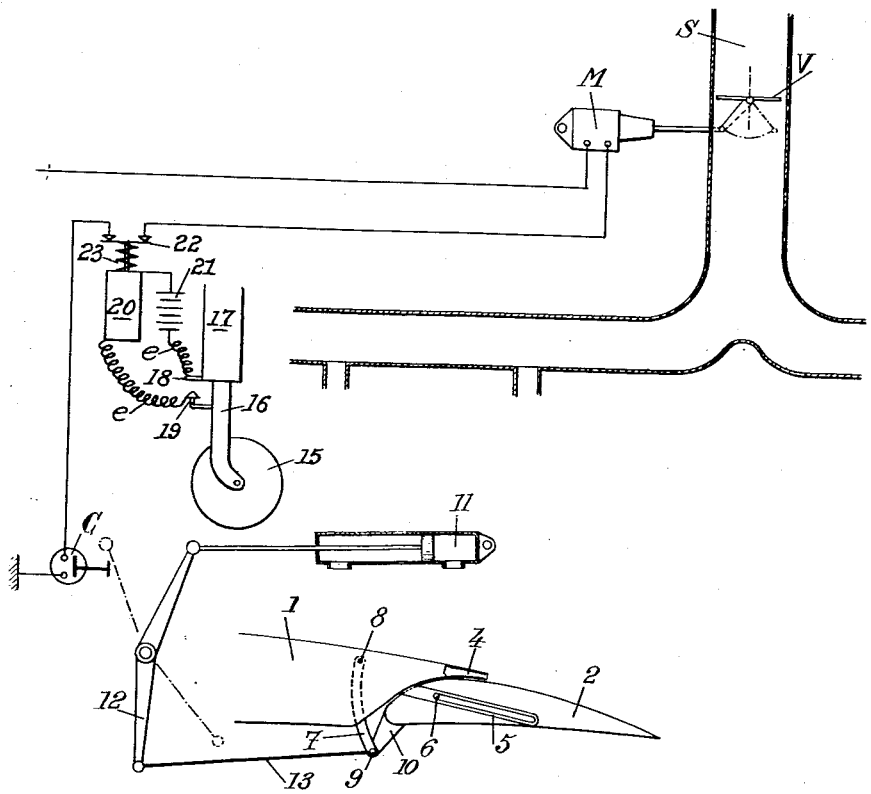

In the following description, it will be supposed that the flap is to be used as a lift increase device.

The wing 1, which may be of any shape, is provided along its trailing edge with a lift increase flap 2 which, in its upper position, is in line with wing 1.

Accordng to the present invention, the means for guiding the movement of flap 2 when it is lowered are arranged in such manner that, for small and intermediate angles of rotation of the flap (corresponding to take-off), a slot 3 is opened between the rear edge of wing 1 and the front edge of flap 2 as shown by Fig. 2, whereas this slot is closed, at least approximately, when the flap comes into its position corresponding to its maximum angle of rotation, as used for landing (Fig. 3), a blowing of gas (air) along the upper face of the flap then replacing the slot effect for this maximum angle of rotation of the flap.

This blowing action permits of obtaining, for the corresponding position of the flap, a very high increase of the lift.

On the contrary, such a blowing would be detrimental when the flap, in the position of Fig. 3, is to serve merely to brake the displacement of the aircraft, which is the case when said aircraft is running after landing. In these conditions, it is desirable not to increase the lift so as to obtain the maximum load on the wheels and therefore a braking as efficient as possible.

Therefore, advantageously, means are provided for stopping, or at least reducing, the blowing of gas on the upper face of flap 2 in the position of Fig. 3 when the aircraft is running after landing.

Anyway, the blowing action issued only when, due to the complete lowering of the flap (Fig. 3), slot 3 is closed, whereas there is no blowing when slot 3 is opened for smaller angles of rotation of the flap.

The blowing effect may be obtained in any suitable manner. For instance, the rear edge of wing 1 may be arranged in the form of a nozzle 4 to which air under pressure is fed from the inside of the wing. The feed of air to this nozzle may be controlled in such manner that it comes automatically into action when flap 2 reaches the position of maximum lowering, for which slot 3 is closed.

For this purpose, in the embodiment illustrated by the drawings, there is provided on the aircraft a blower coupled with the power plant of said aircraft, the outlet pipe S of this blower being provided with a valve V controlled by an electro-motor device M, for instance including an electro-magnet, operated by means of a switch C. The closing of this switch (which causes valve V to be opened against the action of resilient return means) is controlled by an element of the means for controlling the position of flap 2, when said flap reaches its fully lowered position (illustrated by Fig. 3).

It should be well understood that the blower means might be independent of the power plant of the aircraft. The blower means are automatically stopped when the aircraft touches down, for instance as a consequence of the retraction of a shock-absorbing element of the landing gear.

This is accomplished by the mechanism shown in Fig. 1. One of the landing wheels 16 is mounted at the lower end of a rod 16 which can slide into the cylinder 17 at the moment of impact of the wheel with the ground during landing. This movement produces the closing of two contacts 18 and 19 which are fixed respectively to the rod 16 and the cylinder 17, and consequently closes the electrical circuit $e$ in which are arranged an electromagnet 20 and a source of current 21. The electromagnet when excited opens a switch 22 against the action of spring 23 in the control circuit of electromagnet $m$. The circuit is normally kept closed, but the electromagnet upon opening the circuit cuts off the current from electromagnet $m$ and consequently permits the closing of the valve. The supply of air under pressure to the flap is thereby cut off.

Concerning the means for controlling the displacements of the flap, they are advantageously made as shown by Figs. 1 to 3. Accordings to this construction, wing 1 carries, fixed thereto, slideways 5 in which are guided sliding elements 6 rigid with flap 2. Furthermore, links 7 are pivoted at one of their ends, at 8, to wing 1 and at their other end, at 9, to an arm 10 rigid with flap 2.

Flap 2 may be controlled by means of a jack 11 acting upon a lever 12 connected with the links 7 through rods 13 pivoted for instance at 9 to said links. One of the arms of lever 12 cooperates with switch C (as shown in dotted lines on Fig. 1) to close it when flap 2 is in the maximum lowered position (as shown by Fig. 3).

The movement of flap 2 under the effect of this mechanism are illustrated by Figs. 1, 2 and 3.

In the modification illustrated by Fig. 4, flap 2 instead of being solid, as shown by Figs. 1 to 3, is provided with several slots 14.

The advantages of the system above described are as follows:

(1) A very wide range of values of the lift increase effect is obtained.

(2) A very efficient braking action is also obtained owing to the fact that the slot is closed when the flap is lowered to the maximum and there is no blowing action exerted.

It should be well understood that the invention is not limited to the case of lift increase flaps but might also be applied to ailerons or other control surfaces.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft, in combination, a wing, at least one flap adapted to cooperated with said wing, means for movably connecting said flap with said wing to permit of lowering said flap, said means being arranged to open a slot between said wing and said flap for a given range of angles of rotation of said flap and to close said slot for another range of said angles, including the maximum one, means for blowing gas along the upper face of said flap, control means for operating said connecting means, means operatively connected with said control means for operating said gas blowing means in response to the lowering of said flap into said maximum angle of rotation of said flap with respect to said wing, and means for automatically bringing said blowing means out of action during the landing run of said aircraft.

2. A combination according to claim 1 in which the rear edge of the wing is in the form of a nozzle for blowing air on the upper face of the flap.

3. A combination according to claim 1 in which said blowing means include a conduit for feeding air under pressure, a valve in said conduit normally in closed position, and means operatively connected with said control means for opening said valve in response to the lowering of said flap into said maximum angle of rotation.

4. In an aircraft, in combination, a wing, at least one flap adapted to cooperate with said wing, means for movably connecting said flap with said wing to permit of lowering said flap, said means being arranged to close a slot between said wing and said flap when the flap is in line with the wing, to open said slot for intermediate angles of rotation of the flap and to reclose the slot, when the flap comes into its position corresponding to its maximum angle of rotation, means for blowing gas along the upper face of said flap, control means for operating said connecting means and means operatively connected with said control means for operating said gas blowing means in response to the lowering of said flap into said maximum angle of rotation of said flap with respect to said wing.

References Cited in the file of this patent

UNITED STATES PATENTS

| | | |
|---|---|---|
| 2,478,793 | Trey | Aug. 9, 1949 |
| 2,844,337 | MacArthur | July 22, 1958 |